(No Model.)
W. A. CLARK.
CLAMP FOR PLOW IRONS.
No. 519,806. Patented May 15, 1894.
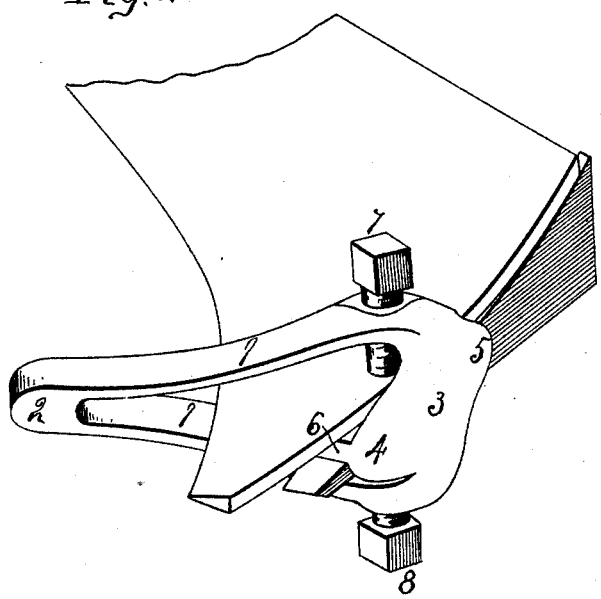
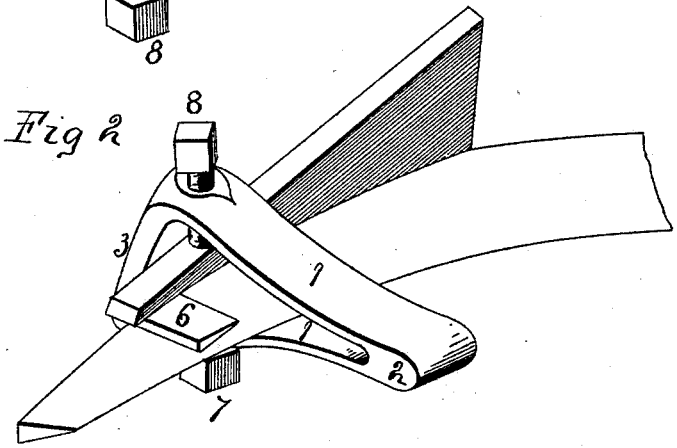
Witnesses:
B. Blinn
E. Behel
Inventor:
William A. Clark
By A. T. Behel
Atty.

UNITED STATES PATENT OFFICE.

WILLIAM A. CLARK, OF ROCKFORD, ILLINOIS, ASSIGNOR OF ONE-HALF TO THOMAS L. O'DONNELL, OF SAME PLACE.

CLAMP FOR PLOW-IRONS.

SPECIFICATION forming part of Letters Patent No. 519,806, dated May 15, 1894.

Application filed February 28, 1894. Serial No. 501,888. (No model.)

*To all whom it may concern:*

Be it known that I, WILLIAM A. CLARK, a citizen of the United States, residing at Rockford, in the county of Winnebago and State of Illinois, have invented certain new and useful Improvements in Clamps, of which the following is a specification.

The object of this invention is to firmly hold the share and land-side point of a plow together during the first heat in welding the parts together.

In the accompanying drawings, Figure 1, is a perspective view of my clamp showing its connection with the upper face of the share. Fig. 2, is a perspective view of the same showing its connection with the land-side point.

My improved clamp consists of the arms 1, joined by the end 2, from which they diverge, and are connected by an end 3, from which extend wings 4, and 5, at right angles to the length of the end and from the wing 4, extends a wedge shaped arm 6, in the lengthwise direction of the arms 1. Set screws 7 and 8 have a connection with the arms near the end 3, their heads located outside of the arms.

In order to place the clamp in position the point of the share of the plow is passed between the arms 1, and the landside point is placed in position on the under face of the share. The clamp is then driven until the wedge shaped arm 6, is forced between the point of the land-side and the share when the set-screws 7 and 8 are turned down clamping the parts together. By means of the wedge shaped arm 6, the point of the landside is separated from the share in order that when the set-screws are turned down the heel of the land-side will be held in close contact with the share in order that the parts may be welded at this point; after which the remaining length of the land-side is welded to the shaft, the clamp being employed for the purpose of obtaining the first weld and the lips 4 and 5, serve to hold the parts in proper alignment.

I claim as my invention—

1. A clamp for holding the landside to the share, consisting of the slotted bracket having a projection extending in the lengthwise direction thereof, and set screws passing through the bracket on one side of the projection.

2. A clamp for holding the landside to the share, consisting of a slotted bracket having a wedge projection extending in the lengthwise direction thereof and set screws passing through the bracket and located on the bevel side of the projection.

WILLIAM A. CLARK.

Witnesses:
A. O. BEHEL,
E. BEHEL.